Reissued June 18, 1935

Re. 19,612

UNITED STATES PATENT OFFICE 19,612

COATING COMPOSITION

William Koch, Wilmington, Del., assignor to Hercules Powder Company, Wilmington, Del., a corporation of Delaware No Drawing. Original No. 1,957,786, dated May 8, 1934, Serial No. 626,226, July 29, 1932. Application for reissue April 27, 1935, Serial No. 18,691

23 Claims. (Cl. 134—17)

This invention relates to an improvement in coating compositions and more particularly to coating compositions which while adaptable for use generally lend themselves especially for use where a corrosion and abrasion resistant coating is desired, as for example, various metal surfaces, pipes to be buried in the ground, etc.

Coating compositions in accordance with this invention will contain essentially chlorinated rubber and an ester of abietic acid, as, for example, alkyl and aralkyl derivatives. The ester of abietic acid or rosin as contained in the compositions in accordance with this invention may be hydrogenated either by hydrogenation of the ester or by producing the ester from hydrogenated abietic acid or rosin.

Compositions in accordance with this invention, in addition to the essential ingredients described above, may contain various other ingredients, as, for example, gums, oils, etc. and will contain a suitable solvent or solvent mixture to give to the compositions desired viscosity or fluidity to enable their application, as for example, by spraying, brushing, dipping or otherwise, as may be desired.

The chlorinated rubber comprising one of the essential ingredients of coating compositions in accordance with this invention may be either chlorinated raw rubber or chlorinated vulcanized rubber, or mixtures thereof, both being contemplated as within the term "chlorinated rubber" as used herein. While the chlorinated rubber will preferably have a relatively high percentage of chlorine, say above 67%, it will be understood that rubber containing any substantial percentage of chlorine, say as low as 50%, will be usable.

The chlorinated rubber, either raw or vulcanized, may be obtained from any source, or may be produced in any suitable manner. Thus, for example, suitable chlorinated rubber may be produced from raw or vulcanized rubber by dissolving the rubber in a solvent, as carbon tetrachloride, which will be unaffected by chlorine, heating the solution to a temperature within the range 80–110° C. and introducing chlorine into the heated solution. Where vulcanized rubber is treated the sulphur will be separated out by the chlorine, appearing as a chloride of sulphur, all, as for example, is more fully disclosed in U. S. Patent No. 1,852,043 to Deseniss and Nielson.

Other methods for the production of suitably chlorinated rubber are disclosed, for example, in the United States patents to Carlton Ellis No. 1,544,530 and No. 1,544,529, to Peachey No. 1,234,381 and to Deseniss and Nielson No. 1,852,043. It will, of course, be understood that suitably chlorinated rubber for use in connection with this invention may be produced in any desired manner, the references made herein being for illustrative purposes only.

Various esters of abietic acid or rosin may be used in the composition in accordance with this invention, as for example, ethyl abietate, methyl abietate, propyl abietate, benzyl abietate, etc., etc. Abietic acid or rosin esters as used may be hydrogenated as has been indicated, and it will be understood that with reference to such esters in the description of compositions in accordance with this invention heretofore and as used in the claims appended hereto, by the term "abietic acid or rosin ester" such esters, either hydrogenated or not hydrogenated, is contemplated.

As has been indicated, various ingredients in addition to those indicated above as essential may be included in compositions in accordance with this invention, as for example, oils, as linseed oil, China wood oil, etc., etc., gums or resins, as ester gum, coumarone, phenol-formaldehyde condensation resins etc., pigments and other ingredients which may be desirable and which are compatible with the essential ingredients, chlorinated rubber and abietic acid or resin ester.

Any suitable solvent or solvent mixture may be used in the preparation of solvent mixtures in accordance with this invention and, for example, a mixture of xylol and toluol, ethylene dichloride, monoalkylated ether of ethylene glycol, ethyl acetate, etc., may be used.

In the formation of compositions in accordance with this invention the essential ingredients may be used in widely varying proportions and other ingredients which may be included may likewise be included in widely varying proportions.

For illustration, for example, chlorinated rubber may be used in amount within say about the range 10–40%, while an abietic acid or resin acid ester may be included within say about the range 2–20%. The solvent or solvent mixture may be used in any desired amount with consideration for the viscosity or fluidity desired for the composition. Thus, for example, the solvent or solvent mixture may be in amount within say about the range 85–40%, to give compositions which may be readily applied as by brushing, spraying, dipping or the like.

As illustrative of the practical adaptation of this invention, for example, satisfactory compositions for various uses may be made up on the following formulæ:

| | | | | | | | |
|---|---|---|---|---|---|---|---|
| Chlorinated rubber | 20 | 20 | 20 | 20 | 20 | 20 | 20 |
| Hydrogenated methyl abietate | 6 | 2 | 4 | 2 | 4 | 4.67 | 4.67 |
| Ester gum | ------ | 6 | 6 | ------ | ------ | ------ | ------ |
| Phenol-formaldehyde resin (amberol H-9) | ------ | ------ | ------ | 6 | 6 | ------ | ------ |
| Boiled linseed oil | ------ | ------ | ------ | ------ | ------ | 3.33 | ------ |
| Boiled China wood oil | | | | | | | 3.33 |
| Xylol | 53.4 | 53.4 | 53.4 | 53.4 | 53.4 | 53.4 | 53.4 |
| Toluol | 26.6 | 26.6 | 26.6 | 26.6 | 26.6 | 26.6 | 26.6 |

It will be understood that abietic acid or resin ester, as methyl abietate which has not been hydrogenated, may be substituted for hydrogenated methyl abietate given in the above formulæ.

The composition in accordance with the above formulæ will be found desirable for various uses and will be found especially desirable where a corrosion resistant coating is desired. As will be appreciated, the formulations given above for purposes of illustration may be widely varied depending upon the particular uses for which they are intended within the scope of this invention.

As has been indicated, the compositions in accordance with this invention may be applied to various surfaces such as wood, metal and the like, by spraying, brushing, dipping, etc., and on evaporation of the volatile ingredients will form a coating having excellent adherence to the surface, of desirable appearance, flexibility, etc., etc., and a very high resistance to corrosion.

What I claim and desire to protect by Letters Patent is:

1. A coating composition including chlorinated rubber and an abietic acid ester of the group alkyl and aralkyl esters and a solvent.

2. A coating composition including chlorinated rubber and a hydrogenated abietic acid ester of the group alkyl and aralkyl esters and a solvent.

3. A coating composition including chlorinated rubber and an abietic acid ester of the group alkyl and aralkyl esters, a resin and a solvent.

4. A coating composition including chlorinated rubber and an abietic acid ester of the group alkyl and aralkyl esters, a drying oil and a solvent.

5. A coating composition including chlorinated rubber and an abietic acid ester of the group alkyl and aralkyl esters, a resin, a drying oil and a solvent.

6. A coating composition including chlorinated rubber about 10–40% and an abietic acid ester about 2–20% of the group alkyl and aralkyl esters and a solvent.

7. A coating composition including chlorinated rubber about 20% and an abietic acid ester about 2–6% of the group alkyl and aralkyl esters and a solvent.

8. A coating composition including chlorinated rubber about 20% and an abietic acid ester about 2–6% of the group alkyl and aralkyl esters and a solvent about 80%.

9. In combination a surface and a film containing chlorinated rubber and an abietic acid ester of the group alkyl and aralkyl esters adhered to and supported on said surface.

10. In combination a surface and a film containing chlorinated rubber and a hydrogenated abietic acid ester of the group alkyl and aralkyl esters adhered to and supported on said surface.

11. In combination a metal surface and a film containing chlorinated rubber and an abietic acid ester of the group alkyl and aralkyl adhered to and supported on said surface.

12. A composition including chlorinated rubber and an abietic acid ester of the group alkyl and aralkyl esters.

13. A composition including chlorinated rubber and a hydrogenated abietic acid ester of the group alkyl and aralkyl esters.

14. A composition including chlorinated rubber, an abietic acid ester of the group alkyl and aralkyl esters and a resin.

15. A composition including chlorinated rubber, an abietic acid ester of the group alkyl and aralkyl esters, a resin and a drying oil.

16. A composition including chlorinated rubber, an abietic acid ester of the group alkyl and aralkyl esters, a resin and linseed oil.

17. A composition including chlorinated rubber within the range about 10%–40% and an abietic acid ester of the group alkyl and aralkyl esters within the range about 2%–20%.

18. A composition including chlorinated rubber, a hydrogenated abietic acid ester of the group alkyl and aralkyl esters, a resin and a drying oil.

19. A composition including chlorinated rubber, an abietic acid ester of the group alkyl and aralkyl esters, and a softening agent for the chlorinated rubber.

20. A composition including chlorinated rubber, an abietic acid ester of the group alkyl and aralkyl esters and China-wood oil.

21. A composition including chlorinated rubber, an abietic acid ester of the group alkyl and aralkyl esters, and boiled China-wood oil.

22. A composition including chlorinated rubber, an abietic acid ester of the group alkyl and aralkyl esters, China-wood oil and ester gum.

23. A composition including chlorinated rubber, an abietic acid ester of the group alkyl and aralkyl esters, and ester gum.

WILLIAM KOCH.